US007304101B2

(12) United States Patent
Hintzer et al.

(10) Patent No.: US 7,304,101 B2
(45) Date of Patent: Dec. 4, 2007

(54) METHOD OF PURIFYING A DISPERSION OF IONIC FLUOROPOLYMER

(75) Inventors: Klaus Hintzer, Kastl (DE); Kai H. Lochhaas, Neuoetting (DE); Tanja Zeif, Fridolfing (DE); Steven J. Hamrock, Stillwater, MN (US); Harold T. Freemyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 368 days.

(21) Appl. No.: 10/894,090

(22) Filed: Jul. 19, 2004

(65) Prior Publication Data
US 2006/0014886 A1    Jan. 19, 2006

(51) Int. Cl.
C08L 1/00    (2006.01)

(52) U.S. Cl. ............... 523/310; 524/544; 524/700; 524/800; 524/805; 526/249; 526/250

(58) Field of Classification Search ............... 523/310; 524/544, 700, 800, 805; 526/249, 250
See application file for complete search history.

(56) References Cited

U.S. PATENT DOCUMENTS

| | | | | |
|---|---|---|---|---|
| 3,282,875 | A | * | 11/1966 | Connolly et al. ........... 524/795 |
| 3,624,053 | A | | 11/1971 | Hugh et al. |
| 3,993,614 | A | * | 11/1976 | Carlson ...................... 524/840 |
| 4,138,373 | A | | 2/1979 | Ukihashi et al. |
| 4,282,162 | A | * | 8/1981 | Kuhls .......................... 554/193 |
| 4,320,205 | A | | 3/1982 | Asawa et al. |
| 4,358,545 | A | * | 11/1982 | Ezzell et al. .................. 521/27 |
| 4,369,266 | A | | 1/1983 | Kuhls et al. |
| 4,433,082 | A | | 2/1984 | Grot |
| 4,940,525 | A | * | 7/1990 | Ezzell et al. ................. 204/252 |
| 5,286,843 | A | | 2/1994 | Wood |
| 5,310,765 | A | | 5/1994 | Banerjee et al. |
| 5,442,097 | A | | 8/1995 | Obermeier et al. |
| 5,595,676 | A | | 1/1997 | Barnes et al. |
| 5,608,022 | A | | 3/1997 | Nakayama et al. |
| 5,973,091 | A | * | 10/1999 | Schmiegel .................. 526/247 |
| 6,025,092 | A | | 2/2000 | Doyle et al. |
| 6,156,451 | A | * | 12/2000 | Banerjee et al. ........... 156/228 |
| 6,436,244 | B1 | | 8/2002 | Führer et al. |
| 6,518,442 | B1 | | 2/2003 | Felix et al. |
| 6,593,019 | B2 | | 7/2003 | Armand et al. |
| 6,593,416 | B2 | * | 7/2003 | Grootaert et al. ........... 524/545 |
| 6,602,968 | B1 | | 8/2003 | Bekiarian et al. |
| 6,610,465 | B2 | | 8/2003 | Rahman et al. |
| 6,613,941 | B1 | | 9/2003 | Felix et al. |
| 6,624,328 | B1 | | 9/2003 | Guerra |
| 6,642,415 | B1 | | 11/2003 | Führer et al. |
| 6,706,193 | B1 | | 3/2004 | Burkard et al. |
| 6,713,567 | B2 | | 3/2004 | Bekiarian et al. |
| 6,720,360 | B1 | | 4/2004 | Grootaert et al. |
| 6,733,914 | B1 | | 5/2004 | Grot et al. |
| 6,825,250 | B2 | * | 11/2004 | Epsch et al. ................ 523/310 |
| 7,041,728 | B2 | | 5/2006 | Zipplies et al. |
| 2002/0013438 | A1 | * | 1/2002 | Grootaert et al. ........... 526/242 |
| 2003/0220442 | A1 | | 11/2003 | Epsch et al. |
| 2004/0107869 | A1 | | 6/2004 | Velamakanni et al. |
| 2004/0121210 | A1 | | 6/2004 | Hamrock et al. |
| 2004/0241518 | A1 | | 12/2004 | Yang |
| 2005/0107490 | A1 | | 5/2005 | Yandrasits et al. |
| 2005/0131097 | A1 | | 6/2005 | Jing et al. |
| 2005/0228127 | A1 | | 10/2005 | Tatemoto et al. |

FOREIGN PATENT DOCUMENTS

| | | |
|---|---|---|
| CA | 2 490 136 A1 | 6/2003 |
| EP | 1 283 225 A1 | 2/2003 |
| EP | 1 529 785 A1 | 5/2005 |
| EP | 1 535 935 A1 | 6/2005 |
| GB | 1034197 | 6/1966 |
| WO | WO 94/03503 | 2/1994 |
| WO | WO 00/35971 | 6/2000 |
| WO | WO 03/020836 A1 | 3/2003 |

OTHER PUBLICATIONS

Yandrasits et al., "Polymer Electrolyet Membranes Crosslinked by Nitrile Trimerization", U.S. Appl. No. 10/712,589, filed Nov. 13, 2003.
Yandrasits et al., "Bromine, Chlorine or Iodine Functional Polymer Electrolytes Crosslinked by E-Beam", U.S. Appl. No. 10/712,590, filed Nov. 13, 2003.
Johnson et al., "Cable and Method of Making the Same", U.S. Appl. No. 10/870,262, filed Jun. 17, 2004.
Hamrock et al., "Method of Hydrolizing a Dispersion of Ionic Fluoropolymer", U.S. Appl. No. 10/894,098, filed Jul. 19, 2004.
The American Heritage College Dictionary, 4$^{th}$ ed, p. 71, Jun. 30, 2004.
Office Action, dated May 9, 2005, mailed in U.S. Appl. No. 10/894,098 entitled "Method of Hydrolyzing a Disperion of Ionic Fluoropolymer" (Hamrock et al.), filed Jul. 19, 2004.
Office Action, dated Sep. 12, 2005, mailed in U.S. Appl. No. 10/894,098 entitled "Method of Hydrolyzing a Dispersion of Ionic Fluoropolymer" (Hamrock et al.), filed Jul. 19, 2004.
Office Action, dated Jan. 6, 2006, U.S. Appl. No. 10/894,098 entitled "Method of Hydrolyzing a Dispersion of Ionic Fluoropolymer" (Hamrock et al.), filed Jul. 19, 2004.

* cited by examiner

Primary Examiner—David W. Wu
Assistant Examiner—Henry S. Hu
(74) Attorney, Agent, or Firm—Bradford B. Wright

(57) ABSTRACT

Anionic species are removed from aqueous dispersions of ionic fluoropolymers using anion exchange resins. In some embodiments, cationic species are also removed using cation exchange resins.

29 Claims, No Drawings

METHOD OF PURIFYING A DISPERSION OF IONIC FLUOROPOLYMER

BACKGROUND

Ionic fluoropolymers (e.g., fluorinated ionomers or fluorinated polyelectrolytes) are polymers that have covalently bound ionic groups such as, for example, $-SO_3^-$. In solid form, the ionic groups are typically present as salts with cationic species (e.g., with $H^+$, $Na^+$ or $Zn^{2+}$), while in aqueous solutions the ionic groups exist as the free $-SO_3^-$ form. Ionic fluoropolymers are used to manufacture membranes that are used in fuel cells. Such membranes are typically formed by casting a dispersion of ionic fluoropolymer in an aqueous medium on a substrate and subsequent removal of the aqueous medium.

Such membranes typically should have low levels of anionic impurities in order for the fuel cell to function properly, while low levels of cationic impurities in the membrane are typically associated with increased durability, performance, and membrane quality.

Known processes for reducing anionic impurities such as, for example, rinsing or extracting rely on purification of coagulated ionic fluoropolymer. After reducing anionic impurities, the coagulated ionic fluoropolymer is generally re-dispersed in an aqueous medium in an expensive process that typically involves harsh conditions and highly specialized equipment.

Subsequently, cationic impurities are removed by an exchange process, and the purified dispersion is then cast onto a substrate to form a membrane that is incorporated into a fuel cell.

SUMMARY

In one aspect, the present invention provides a method of purifying a dispersion of ionic fluoropolymer comprising:

providing a dispersion of ionic fluoropolymer in an aqueous medium, the ionic fluoropolymer comprising ionic monomeric units and non-ionic monomeric units, wherein the ionic monomeric units have at least one group represented by the formula $-R^1SO_3^-$, wherein $R^1$ is a perfluoroalkylene group having from 1 to 15 carbon atoms, or a perfluoroalkyleneoxy or perfluoropoly(alkyleneoxy) group having from 1 to 15 carbon atoms and from 1 to 4 oxygen atoms, wherein the ionic fluoropolymer has an sulfonate equivalent weight in the range of from at least 600 grams up to and including 1200 grams, and wherein the dispersion of ionic fluoropolymer contains anionic species that are not covalently bound to the ionic fluoropolymer;

contacting the dispersion of ionic fluoropolymer with an anion exchange resin having associated hydroxide ions, such that at least a portion of the anionic species are exchanged with hydroxide ions to provide an anion-exchanged dispersion; and separating the anion-exchanged dispersion from the anion exchange resin, wherein the anion-exchanged dispersion comprises ionic fluoropolymer.

In one embodiment, the dispersion further comprises cationic species that are not covalently bound to the ionic fluoropolymer, and method further comprises contacting the dispersion with a cation exchange resin having acidic protons, such that at least a portion of the cationic species are exchanged with protons.

In another embodiment, at least a portion of the cations are exchanged prior to exchanging at least a portion of the anions.

Advantageously, anionic species can be reduced according to the present invention in a simple process without the need for highly specialized equipment.

As used herein:

the term "sulfonate equivalent weight" refers to that weight of polymer containing one mole of sulfonate groups (i.e., $-SO_3^-$);

the term "fluoropolymer" refers to an organic polymer having a fluorine content of at least 30 percent by weight based on the total weight of the polymer; and the phrase "is substantially free of nonionic emulsifier" means containing less than 0.001 weight percent of nonionic emulsifier based on the total weight of ionic fluoropolymer.

Numerical ranges set forth herein are inclusive of their endpoints unless otherwise specified.

DETAILED DESCRIPTION

The method of the present invention is useful for purifying dispersions of ionic fluoropolymers that comprise ionic monomeric units and non-ionic monomeric units (as defined hereinbelow).

Generally, the ionic fluoropolymers may be prepared by polymerizing a mixture of hydrolyzable monomers and non-hydrolyzable monomers to form a hydrolyzable polymer. The hydrolyzable polymer thus has hydrolyzable monomeric units which may be, for example, in an amount of from about at least 5 or 15 mole percent up to and including about 25, 30, or even 50 mole percent, of which at least a portion (typically substantially all) are converted into ionic monomeric units, for example, by base catalyzed hydrolysis. After hydrolysis, the sulfonate equivalent weight of useful ionic fluoropolymers is generally in the range of from at least 600, 700, or 800 grams up to and including 1000, 1100 or even 1200 grams.

The hydrolyzable monomeric units are represented by Formula I:

$$F_2C=CF-R^1-SO_2X \qquad (I)$$

wherein:

$R^1$ is a perfluoroalkylene group (e.g., branched or unbranched perfluoroalkylene) having from 1 to 15 carbon atoms, or a perfluoroalkyleneoxy or perfluoropoly(alkyleneoxy) group (e.g., branched or unbranched) having from 1 to 15 carbon atoms and from 1 to 4 oxygen atoms; and X represents F, Cl, or Br; typically fluorine or chlorine, more typically fluorine.

For example, $R^1$ may be $-(CF_2)_a-$ or $-O(CF_2)_a-$, wherein a is an integer in the range of from 1 to 15 (e.g., 1, 2, 3, 4, 5, 6, 7, 8, 9, 10, 11, 12, 13, 14, or 15); $-(CF_2CF(CF_3))_b-$, $-(CF(CF_3)CF_2)_b-$, $-(OCF_2CF_2CF_2)_b-$, $-(OCF_2CF(CF_3))_b-$, or $-(OCF(CF_3)CF_2)_b-$, wherein b is an integer in the range of from 1 to 5 (e.g., 1, 2, 3, 4, or 5); $-(CF_2CF(CF_3))_cCF_2-$, $-(OCF_2CF(CF_3))_cOCF_2CF_2-$, or $-(OCF(CF_3)CF_2)_cOCF_2CF_2-$, wherein c is an integer in the range of from 1 to 4 (e.g., 1, 2, 3, or 4); $-(OCF_2CF_2CF_2CF_2)_d-$, $-(OCF_2CF(CF_2CF_3))_d-$, $-(OCF(CF_2CF_3)CF_2-)_d$, $-(OCF_2CF(CF_2CF_3))_d OCF_2CF_2-$, $-(OCF(CF_2CF_3)CF_2)_d OCF_2CF_2-$, wherein d is an integer in the range of from 1 to 3 (e.g., 1, 2, or 3); or $(-O-CF_2CF_2-)_e$, wherein e is an integer in the range of from 1 to 7 (e.g., 1, 2, 3, 4, 5, 6, or 7). In one embodiment, $R^1$ is typically $-O-CF_2CF_2CF_2CF_2-$ or $-OCF_2CF(CF_3)OCF_2CF_2-$.

Such monomers can be prepared according any suitable means including, for example, methods disclosed in U.S.

Pat. No. 6,624,328 B1 (Guerra) and U.S. Pat. No. 6,593,019 (Armand et al.), the disclosures of which are incorporated herein by reference.

Typically, the hydrolyzable fluoropolymer is prepared by copolymerizing at least one hydrolyzable monomer represented by Formula I with at least one neutral (i.e., not hydrolyzable or ionizable in water) ethylenically unsaturated co-monomer that, when incorporated into the hydrolyzable polymer, results in a monomeric unit does not hydrolyze appreciably under basic hydrolysis conditions used to hydrolyze the hydrolyzable monomeric units (i.e., a non-hydrolyzable monomeric unit).

Useful ethylenically unsaturated neutral co-monomers include perfluorinated co-monomers represented by Formula II:

$$F_2C=CFR^2 \qquad (II)$$

wherein $R^2$ represents F or a branched or unbranched perfluoroalkyl, perfluoroalkoxy or perfluoropoly(alkyleneoxy) group comprising 1 to 5 carbon atoms and 0 to 2 oxygen atoms. Examples include tetrafluoroethylene, hexafluoropropylene, $CF_3OCF_2CF_2CF_2OCF=CF_2$, $CF_3OCF=CF_2$, $CF_3CF_2CF_2OCF=CF_2$, perfluoro-1,3-dioxoles such as those described in U.S. Pat. No. 4,558,142 (Squire), fluorinated diolefins (e.g., perfluorodiallyl ether or perfluoro-1,3-butadiene), and combinations thereof.

Useful ethylenically unsaturated co-monomers also include perfluorinated vinyl ether represented by Formula III:

$$F_2C=CFO(R_fO)_n(R_f'O)_mR_f'' \qquad (III)$$

wherein $R_f$ and $R_f'$ are different linear or branched perfluoroalkylene groups having 2 to 6 carbon atoms, m and n are independently integers in the range of from 0 to 10 (e.g., 0, 1, 2, 3, 4, 5, 6, 7, 8, 9, or 10), wherein the sum of n and m is at least 1, and $R_f''$ is a perfluoroalkyl group having 1 to 6 carbon atoms.

Examples of perfluorinated vinyl ethers of formula (III) include compounds of the formula (IV):

$$F_2C=CFO(CF_2CF_2CFZO)_pR_f'' \qquad (IV)$$

wherein $R_f''$ is as previously defined, p is an integer in the range of from 1 to 5 (e.g., 1, 2, 3, 4, or 5), and Z is F or $CF_3$. Examples of compounds of formula (IV) include those in which $R_f''$ is $C_3F_7$, p=1, Z=F or $CF_3$ and $CF_3OCF(CF_3)CF_2CF_2OCF=CF_2$. Further useful fluorinated vinyl ethers included in formula (III) correspond to the formula (V):

$$F_2C=CFO(CF_2CFXO)_pR_f''' \qquad (V)$$

wherein p is as previously defined, X is F or $CF_3$, and $R_f'''$ is a perfluoroalkyl group having from 1 to 5 carbon atoms. Examples of monomers of formula V include those wherein X is $CF_3$ and $R_f'''$ is perfluorinated n-propyl, and p is 1 or p is 2.

Additional perfluorinated vinyl ether monomers useful in the invention include compounds of the formula $$F_2C=CFO[(CF_2CF(CF_3)O)_i(CF_2CF_2CF_2O)_j(CF_2)_k]C_xF_{2x+1} \qquad (VI)$$

wherein i and j are independently integers in the range of from 0 to 10 (e.g., 1, 2, 3, 4, 5, 6, 7, 8, 9, or 10), k is an integer in the range of from 0 to 3 (e.g., 0, 1, 2, or 3), and x is an integer in the range of from 1 to 5 (e.g., 1, 2, 3, 4, or 5). Examples include compounds wherein j=1, i=1, k=0, and x=1.

Still further examples of perfluorinated vinyl ethers include ethers corresponding to formula (VII):

$$F_2C=CFOCF_2CF(CF_3)O(CF_2O)_qCF_3 \qquad (VII)$$

wherein q is an integer in the range of from 0 to 3 (e.g., 0, 1, 2, or 3).

In addition, non-perfluorinated ethylenically unsaturated co-monomers may be used, typically in combination with at least one of the perfluorinated co-monomers listed above. Examples include ethylene, propylene, butylene, trifluoroethylene, 1-hydropentafluoropropene, 2-hydropentafluoropropene, vinyl fluoride, and vinylidene difluoride, and combinations thereof. If used, the amount of these co-monomers in the final copolymer is typically less than 40 mole percent, and more typically less than 20 mole percent.

Additional non-perfluorinated co-monomers that may be used include those represent by Formula VIII:

$$F_2C=CF[OCF_2CF(CF_3)]_fO(CF_2)_gC(=O)OCH_3 \qquad (VIII)$$

wherein f is an integer in the range of from 0 to 3 (e.g., 0, 1, 2, or 3), and g is an integer in the range of from 0 to 6 (e.g., 0, 1, 2, 3, 4, 5, or 6).

Additional neutral monomers include cure site monomers (CSMs) having groups containing Br, Cl, I, or —CN. Useful CSMs include those having the formula $CF_2=CY-Q$ where Y is typically F but may also be $CF_3$, and where Q is a group which includes Br, Cl, I, or CN. Typically, Q is highly fluorinated or perfluorinated group, for example, having the formula —$R^1$-Z, where $R^1$ is as described above and Z is Br, Cl, I, or CN. Further details concerning useful CSMs and methods for curing them may be found in U.S. Pat. Appl. Publ. Nos. 2005/0107489 A1 (Yandrasits et al.) and 2005/0107490 A1 (Yandrasits et al.), the disclosures of which are incorporated herein by reference.

The foregoing monomers, generally in combination with an effective amount of a free radical initiator (e.g., ammonium persulfate or a redox system such as ammonium persulfate/disulfite and potassium permanganate, and peroxides such as, for example, substituted dibenzoyl peroxides, cumene hydroperoxide, and bisperfluoropropionyl peroxide). Suitable aqueous emulsion polymerization techniques are described, for example, in U.S. Pat. No. 4,138,373 (Ukihashi et al.) and U.S. Pat. No. 4,320,205 (Asawa et al.). To ensure a homogeneous incorporation and high utilization of liquid monomers, so-called pre-emulsification techniques may be used, whereby the liquid co-monomers are pre-emulsified in water with perfluorinated emulsifiers (e.g. salts of perfluorooctanoates (i.e., APFO)) prior to the polymerization with other gaseous monomers. Such procedures and techniques are described in U.S. Pat. No. 5,608,022 (Nakayama et al.); U.S. Pat. No. 5,595,676 (Barnes et al.); and U.S. Pat. No. 6,602,968 (Bekiarian et al.).

The content of fluoropolymer having a plurality of pendant hydrolyzable groups represented by the formula —$R^1SO_2X$, hereinafter referred to as the "hydrolyzable fluoropolymer", in dispersions according to the present invention may be any amount greater than zero (e.g., at least 1, 5, 10, 20, 30, or 40 percent by weight or more), but typically is in the range of from 15 to 45 percent by weight.

The hydrolyzable fluoropolymer may have a fluorine content of at least 30, 40, 50, 60 or even at least 70 percent by weight based on the total weight of the polymer. In one embodiment, the fluoropolymer may be perfluorinated.

Residual neutral monomer(s) may be removed, for example, by water steam distillation (e.g., stripping) either before or after hydrolysis.

The hydrolyzable fluoropolymer may be hydrolyzed as a dispersion, for example, as described in concurrently filed U.S. Pat. Appl. Publ. No. 2006/0014887 A1 (Hamrock et al.) the disclosure of which is incorporated herein by reference; or the hydrolyzable fluoropolymer may be isolated by coagulation and optional removal of residual monomer and/or anionic species (e.g., surfactants and emulsifiers), and then redispersed in a basic aqueous medium, for example, using vigorous shear mixing. Methods for coagulating, purifying re-dispersing and hxdrolyzing hydrolyzable fluoropolymers are described in, for example, U.S. Pat. Nos. 6,593,416 (Grootaert et al.) and U.S. Pat. No. 6,733,914 (Grot et al.), the disclosures of which are incorporated herein by reference.

Once hydrolyzed, and optionally re-dispersed, the hydrolyzed dispersion (i.e., a dispersion of ionic fluoropolymer) is purified to remove anionic and optionally cationic species. As used herein the term "purify" refers to at least partially removing impurities, regardless of whether or the removal is complete. Anionic species that may constitute impurities include, for example, fluoride, anionic residues from surfactants and emulsifiers (e.g., perfluorooctanoate), and anionic residues from hydrolyzed monomer (e.g., $F_2C=CFO(CF_2)_4SO_3^-$). It should be noted, however, that it is not desirable to remove the ionic fluoropolymer from the dispersion.

Typically, dispersions of ionic fluoropolymer obtained as above are essentially free (i.e., contain less than 0.1 percent by weight) of nonionic fluoropolymers, although the method may be practiced with nonionic fluoropolymers present.

According to the present invention, it is found that anionic species may be effectively removed, in the presence of the ionic fluoropolymer, by contacting the hydrolyzed dispersion with an effective amount of anion exchange resin. Useful anion exchange resins typically comprise a polymer (typically crosslinked) that has a plurality of cationic groups (e.g., quaternary alkyl ammonium groups) paired with various anions (e.g., halide or hydroxide). Upon contact with the hydrolyzed dispersion anionic impurities in the dispersion become associated with the anion exchange resin. After the anion exchange step, the resultant anion-exchanged dispersion is separated from the anion exchange resin, for example, by filtration. Surprisingly, it is found that the anionic hydrolyzed fluoropolymer does not appreciably become immobilized on the anion exchange resin, which would lead to coagulation and/or material loss.

Anionic exchange resins are available commercially. Examples of commercially available anion exchange resins include resins having the trade designation "AMBERLITE IRA-402", "AMBERLYST A26OH", or "AMBERJET 4200" available from Rohm & Haas Company, Philadephia, Pa.; resins having the trade designation "PUROLITE A845" available from The Purolite Company, Bala Cynwyd, Pa.; resins having the trade designation "LEWATIT MP-500" available from Sybron Chemicals, Birmingham, N.J.; and resins having the trade designations "DOWEX 1×2" and "DOWEX 1×8" available from Dow Chemical, Midland, Mich.

Anion exchange resins such as those described above are commonly supplied commercially as salts with either hydroxide or some other anion. If the anion exchange resin is not in the hydroxide form it should be at least partially converted, typically fully converted, to the hydroxide salt form. This is typically done by treating the anion exchange resin with an aqueous ammonia or sodium hydroxide solution.

Typically, better yields are obtained using gel-type anion-exchange resins than with macroporous anion exchange resins.

Typical cationic impurities resulting from the abovementioned polymerization and hydrolysis steps include, for example, one or more of, alkali metal cation(s) (e.g., $Li^+$, $Na^+$, $K^+$), ammonium, quaternary alkyl ammonium, alkaline earth cations (e.g., $Mg^{2+}$, $Ca^{2+}$), and Group III metal cations. Useful cation exchange resins include polymers (typically cross-linked) that have a plurality of pendant anionic or acidic groups such as, for example, polysulfonates or polysulfonic acids, polycarboxylates or polycarboxylic acids. Sulfonic acid cation exchange resins contemplated for use in the practice of the invention include, for example, sulfonated styrene-divinylbenzene copolymers, sulfonated crosslinked styrene polymers, phenol-formaldehyde-sulfonic acid resins, and benzene-formaldehyde-sulfonic acid resins. Carboxylic acid cation exchange resin is an organic acid, cation exchange resin, such as carboxylic acid cation exchange resin.

Cation exchange resins are available commercially. Examples of suitable commercially available cation exchange resins include: resins having the trade designations "AMBERJET 1200", "AMBERLITE IR-120", "AMBERLITE IR-122", or "AMBERLITE 132 E" available from Rohm and Haas Company, Philadelphia. Pa.; resins having the trade designations "DIAION SK 1B" and "DIAION SK 110" available from Mitsubishi Chemical, Tokyo, Japan; resins having the trade designations "DOWEX HCR-W2", "DOWEX HCR-S", and "DOWEX 650C", available from Dow Chemical Company, Midland, Mich.; resins having the trade designations "IONAC C-249", "IONAC C-253", "IONAC C-266", and "IONAC C-267"; and resins having the trade designations "LEWATIT S100", "LEWATIT S100H" (acid form), "LEWATIT S110", "LEWATIT S110H" (acid form), "LEWATIT S1468", "LEWATIT MONOPLUS SP 112", "LEWATIT MONOPLUS SP 112" (acid form), "LEWATIT S 2568", and "LEWATIT S 2568H" (acid form), all available from Sybron Chemicals, Inc.; and resins having the trade designations "PUROLITE C-100", "PUROLITE C-100 E", "PUROLITE C-100×10", and "PUROLITE C-120 E" available from The Purolite Company. It is expected that other products of the same type would be equally satisfactory.

Cation exchange resins such as those described above are commonly supplied commercially in either their acid or their sodium form. If the cation exchange resin is not in the acid form (i.e., protonated form) it should be at least partially converted, typically fully converted, to the acid form in order to avoid the generally undesired introduction of other cations into the dispersion. This conversion to the acid form may be accomplished by means well known in the art, for example by treatment with any adequately strong acid.

The anion exchange resin and cation exchange resin may be used individually or in combination as, for example, in the case of a mixed resin bed having both anion and cation exchange resins.

In one method, ion exchange resins (anion exchange resins and/or cation exchange resins) may be used in a packed column configuration where the dispersion of ionic fluoropolymer is passed through the column. In this method, the flow rate of the dispersion through column is typically in the range of from 0.5 to 20 bed-volumes per hour, more typically 2 to 10 bed-volumes per hour, although lower and higher flow rates may also be used.

In another method (i.e., a non-fixed resin bed process), loose ion exchange resin particles may be added to dispersion of ionic fluoropolymer with mild agitation, and later removed by filtration. Ways to agitate include shaking a vessel containing the mixture, stirring the mixture in a vessel with a stirrer, rotating the vessel, and bubbling a gas (e.g., nitrogen or air) through the mixture. A further method to cause agitation of the mixture of ion exchange resin and dispersion of ionic fluoropolymer is fluidizing the ion exchange resin. Fluidization may be caused by flowing the dispersion through the ion exchange resin in a vessel whereby the flow of the dispersion causes the exchange resin to swirl. The conditions of agitation are generally selected such that on the one hand, the anion exchange resin is fully contacted with the dispersion (i.e., the anion exchange resin is completely immersed in the dispersion), and yet the agitation conditions will be sufficiently mild so as to avoid damaging the ion exchange resin.

Typically, performing the anion exchange process using ionic fluoropolymer dispersions having a solids content of less than 10 percent by weight minimizes loss of the ionic fluoropolymer (by adsorption to the anion exchange resin during the process. Generally, to maintain high material throughput the anion exchange process is typically carried out using a solids content in the range of from at least 5 percent up to 10 or 20 percent by weight of the ionic fluoropolymer dispersion.

Optionally, the concentration of the ionic fluoropolymer dispersion (e.g., before and/or after further purification) may be increased (e.g., by removal of water and/or organic solvent by evaporation or azeotropic distillation) and/or reduced (e.g., by addition of water and/or organic solvent). Typically, if the ionic fluoropolymer dispersion is to be used to form a membrane, the concentration of ionic fluoropolymer is increased to a high level (e.g., at least 20, 30, or 40 percent by weight) and a water-miscible organic solvent is added to facilitate film formation. Examples of water-miscible solvents include, lower alcohols (e.g., methanol, ethanol, isopropanol, n-propanol), polyols (e.g., ethylene glycol, propylene glycol, glycerol), ethers (e.g., tetrahydrofuran and dioxane), ether acetates, acetonitrile, acetone, and combinations thereof.

The resultant at least partially purified ionic fluoropolymer dispersion may be used to form a polymer electrolyte membrane by any suitable method including, for example, bar coating, spray coating, slit coating, brush coating, casting, molding, and extrusion. After forming, the membrane may be annealed, typically at a temperature of 120° C. or higher, more typically 130° C. or higher, most typically 150° C. or higher. Typically, the membrane has a thickness of less than 90 microns, more typically less than 60 microns, and more typically less than 30 microns.

The ionic fluoropolymer dispersion may be combined with catalyst and carbon particles to form a catalyst ink that may be used in the fabrication of membrane electrode assemblies (MEAs) for use in fuel cells. Specific details concerning the preparation of catalyst inks and their use in fabrication of membrane assemblies may be found, for example, in U.S. Pat. Publ. No. 2004/0107869 A1 (Velamakanni et al.), the disclosure of which is incorporated herein by reference.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

Test Methods

Melt flow index (MFI) was measured according to ISO 12086 (December 1985), using a standardized extrusion die of 2.1 mm diameter and 8 mm length at 265° C. and a 5 kg load.

Particle size was measured by dynamic light scattering according to ISO/DIN 13321 (October 2003) using an apparatus available from Malvern Instruments under the trade designation "ZETASIZER 1000 HAS". Prior to the measurements the latex was diluted with 0.001 mole/liter potassium chloride. The temperature of the measurements was 20° C. The Z-average values are reported.

Incorporation of monomers having —$SO_2F$ groups was measured using two methods:

1) Fourier Transform Infrared Spectrometer available under the trade designation "NICOLET OMNIC 5.1" from Thermo Electron Corporation, Waltham, Mass. The measurements were done using transmission technique on hot-pressed films (100-200 micrometers thickness). The MV4S-content in mole percent was determined (in Absorbance mode) as the peak height at 1004 $cm^{-1}$ divided by the peak height at 2365 $cm^{-1}$ multiplied by 0.0632.

2) $^{19}$F-NMR using a nuclear magnetic resonance spectrometer available from Varian, Inc., Palo Alto, Calif., under the trade designation "INOVA 400 WB" equipped with a 3.2 mm MAS probe.

The degree of hydrolysis of the $SO_2F$-containing polymer was determined by attenuated total reflectance infrared spectroscopy (ATR IR) using a Fourier Transform Infrared Spectrometer available under the trade designation "NICOLET OMNIC 5.1" from Thermo Electron Corporation. The measurements were made using the ATR technique on hot-pressed films (100-200 micrometers thickness). The degree of hydrolysis in percent was determined by measuring the baseline corrected peak height at 1050-1080 $cm^{-1}$ and dividing by the baseline corrected peak height at 1450-1475 $cm^{-1}$.

Preparation of $F_2C$=$CFO(CF_2)_4SO_2F$ (MV4S)

The preparation of $F_2C$=$CFO(CF_2)_4SO_2F$ is described in U.S. Pat. No. 6,624,328 (Guerra), the disclosure of which is incorporated herein by reference.

Preparation of Fluorinated Hydrolyzable Polymer Dispersion (Dispersion A)

390 g of MV4S was pre-emulsified into 270 g of water with the addition of 13.5 g of $LiOH·H_2O$ over 5 minutes under high shear conditions (24,000 rpm, using a mixer available under the trade designation "ULTRA-TURRAX MODEL T 25 DISPERSER" available from IKA-Werke GmbH & Co. KG, Staufen, Germany). The resultant milky white dispersion had an average particle size of 1.5 micrometers and a shelf life of >3 hours. A 53-liter polymerization kettle equipped with an impeller agitator system was charged with 23 kg of deionized water. The kettle was heated at 60° C., and then the pre-emulsion was charged into the oxygen-free polymerization kettle. At 60° C. the kettle was further charged with 630 g of gaseous tetrafluoroethylene (TFE) to 6 bars (600 kPa) absolute reaction pressure. At 60° C. and 240 rpm agitator speed the polymerization was initiated by addition of 15 g of sodium disulfite and 40 g of ammonium peroxodisulfate. During the course of the reaction, the reaction temperature was maintained at 60° C. Reaction pressure was maintained at 6 bars (600 kPa) absolute reaction pressure by feeding additional TFE into the gas phase.

A second portion of MV4S-pre-emulsion was prepared in the same manner and proportions described above, but using 4,600 g of MV4S, 160 g of LiOH.H$_2$O and 3,200 g of water. The second pre-emulsion portion was fed into the liquid phase during the course of the reaction continuously. After feeding 6,150 g of TFE in 252 minutes polymerization time, the monomer valve was closed and the monomer feed interrupted. The continuing polymerization reduced the pressure of the monomer gas phase to 2 bars (200 kPa) within 40 minutes. At that time, the reactor was vented and flushed with nitrogen gas. The 38.4 kg of polymer dispersion thus obtained had a solids content of 29.2 percent and a pH of 3. The average particle size of the latex was 139 nanometers, as measured using dynamic light scattering. The freeze-coagulated polymer was pressed into 100 to 200 micrometers thick films at 300° C. Infrared spectroscopic measurements on the polymer films showed an incorporation of 14.1 mole percent of MV4S. The melt flow index of the polymer films at 265° C. and 5 kg was 0.3 grams/10 minutes.

Preparation of Fluorinated Hydrolyzable Polymer Dispersion (Dispersion B)

900 g of MV4S was pre-emulsified into 560 g of water with the addition of 16 g of a 30 percent by weight perfluorooctanoate ammonium salt solution (available under the trade designation "3M FLUORAD FX1006" from 3M Company, St. Paul, Minn.) over 10 minutes under high shear conditions (24,000 rpm, using a mixer available under the trade designation "ULTRA-TURRAX MODEL T 25 DISPERSER" available from IKA-Werke GmbH & Co. KG, Staufen, Germany). The particle size of the dispersion was approximately 1500 nanometers. A 53-liter polymerization kettle equipped with an impeller agitator system was charged with 37 g of ammonium oxalate monohydrate and 7 g of oxalic acid dihydrate in 22.9 kg of deionized water and 269 g of 30 percent by weight perfluorooctanoate ammonium salt solution (available under the trade designation "3M FLUORAD FX1006" from 3M Company). The oxygen-free kettle was then heated to 50° C. and the agitation system was set to 240 rpm. After the kettle was purged with tetrafluoroethylene (TFE), the pre-emulsion was then charged into the reaction kettle. The kettle was further charged with 705 g of gaseous tetrafluoroethylene (TFE) to 6 bars (600 kPa) absolute reaction pressure. Polymerization was initiated by addition of 140 g of a 1 percent by weight solution of potassium permanganate. During the course of the reaction, the reaction temperature was maintained at 50° C. Reaction pressure was maintained at 6 bars (600 kPa) absolute reaction pressure by feeding additional TFE into the gas phase. A second Mv4S-pre-emulsion was prepared in the same manner described above, using 4,170 g of MV4S, 73 g of 30 percent by weight perfluorooctanoate ammonium salt solution (available under the trade designation "3M FLUORAD FX1006" from 3M Company) and 2,500 g of water. The second pre-emulsion was fed into the liquid phase during the course of the reaction. After feeding 5,575 g of TFE in 330 minutes polymerization time, the monomer valve was closed and the monomer feed interrupted. The continuing reaction reduced the pressure of the monomer gas phase to 3.4 bar (340 kPa) within 40 minutes. At that time, the reactor was vented and flushed with nitrogen gas. The 37.1 kg of polymer dispersion thus obtained had a solids content of 27.5 percent by weight and a pH of 3. The dispersion consisted of latex particles having a diameter of 70 nanometers. The polymer was freeze-coagulated, washed with demineralized water in four cycles and was dried for 15 hours at 130° C. Solid state $^{19}$F-NMR spectroscopic analysis indicated that the polymer contained 85.3 mole percent TFE and 14.7 mole percent MV4S. The peak height ratio of the —SO$_3^-$ absorbance to the —SO$_2$F absorbance for the polymer was 0.007 (measured as a hot pressed film), and the melt flow index at 265° C. and 2.16 kg was 0.2 g/10 minutes.

Hydrolysis of Fluorinated Hydrolyzable Polymer Dispersions

Dispersion A (1000 g) was hydrolyzed with stirring using 31 g of lithium hydroxide monohydrate at 80° C. for 4 hours. The resultant ionic fluoropolymer dispersion, which had no discernible —SO$_2$F as measured by ATR IR, was diluted with deionized water to a concentration of 5 percent by weight (Dispersion AH). The ion content of Dispersion AH was: Li$^+$=4000 parts per million (ppm); NH$_4^+$=150 ppm; Na$^+$=100 ppm; F$^-$=5000 ppm; SO$_4^{2-}$=800 ppm; SO$_3^{2-}$=300 ppm; MV$_4$SO$_3^-$=17000 ppm.

Dispersion B was cation-exchanged to remove Mn$^{2+}$ ions that could form MnO$_2$ during the hydrolysis, and then hydrolyzed in the same manner as Dispersion A. Cation exchange was carried out according to the Purification of Ionic fluoropolymer Dispersion (Method 2) procedure below, wherein 20 g of cationic exchange resin (trade designation "DOWEX 650C") was used per 1000 g of Dispersion B. The resultant ionic fluoropolymer dispersion, which had no discernible —SO$_2$F as measured by ATR IR, was diluted with deionized water to a concentration of 5 percent by weight (Dispersion BH). The ion content of Dispersion BH was: Li$^+$=6000 ppm; NH$_4^+$=350 ppm; K$^+$=100 ppm; Mn$^+$=40 ppm; F$^-$=6300 ppm; C$_2$O$_4^{2-}$=600 ppm; PFOA$^-$=3000 ppm; MV$_4$SO$_3^-$=14000 ppm.

Purification of Ionic fluoropolymer Dispersion (Method 1)

Aliquots of Dispersion AH and Dispersion BH were individually cation-exchanged using a 400-mL column filled with 315 g of cation exchange resin (available under the trade designation "DOWEX 650C" from Dow Chemical, Midland, Mich.) at a rate of one bed volume per hour. After 13 hours, this procedure was finished and analysis by Flame Atomic Absorption Spectrometry showed the level of metal cations and ammonium ions was below 1 part per million.

The cation-exchanged dispersions were then each anion-exchanged using a 400-mL column filled with 250 g of anion exchange resin (available under the trade designation "AMBERLYST A260H" from Rohm and Haas Company, Philadelphia, Pa.) at a rate of one bed volume per hour. This process took 13 hours. Analysis (MV4SO$_3^-$ content was determined using high performance liquid chromatography; F$^-$ content was determined using ion selective electrode, C$_7$F$_{15}$COO$^-$: was determined by gas chromatography) showed less than 50 parts per million of low molecular weight anionic species with molecular weight below 2,000 g/mole in the purified dispersions. Dispersion AH purified as above is denoted Dispersion AHP1. Dispersion BH purified as above is denoted Dispersion BHP1.

Purification of Ionic fluoropolymer Dispersion (Method 2)

Aliquots of Dispersion AH and Dispersion BH were individually cation-exchanged using 612 g of cation exchange resin (available under the trade designation "DOWEX 650C" from Dow Chemical) stirred in a 2-L round bottom flask with heating at a temperature of from 40° C. to 50° C. After 5 hours, this procedure was finished and analysis by Flame Atomic Absorption Spectrometry showed the level of metal cations and ammonium ions was below 1 part per million.

The cation-exchanged dispersions were then each anion-exchanged using a 430 g of anion exchange resin (available under the trade designation "AMBERLYST A26OH" from Rohm and Haas Company) stirred in a 2-L round bottom flask at elevated temperatures for 2 hours. Analysis (MV4SO$_3$⁻ content was determined using high performance liquid chromatography (HPLC); F⁻ content was determined using an ion selective electrode; perfluorooctanoate (PFOA⁻) was determined by gas chromatography) showed less than 50 parts per million of low molecular weight anionic species with molecular weight below 2,000 g/mole in the purified dispersions. Dispersion AH purified as above is denoted Dispersion AHP2. Dispersion BH purified as above is denoted Dispersion BHP2.

Concentration of Ion Exchanged Dispersions and Dilution with n-Propanol

The purified ionic fluoropolymer dispersions prepared above (i.e., Dispersions AHP1, BHP1, AHP2, and BHP2) were concentrated to 40 percent solids by weight in a 2-L round bottom flask using a stirrer at 80° C., and at a reduced pressure of 200 mbar (0.2 kPa). The resulting gel (500 g) was combined with 500 g of n-propanol at 65° C. Each of the four purified dispersions had 20 percent by weight polymer solids; 30 percent by weight water (by Karl-Fischer Method); 50 percent by weight n-propanol, pH=2; Li⁺ concentration of less than <1 part per million (ppm) (by Flame Atomic Absorption Spectrometry); PFOA⁻<5 ppm (by HPLC); F-<15 ppm (by ion selective electrode).

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of purifying a dispersion of ionic fluoropolymer comprising:
   providing a dispersion of ionic fluoropolymer in an aqueous medium, the ionic fluoropolymer comprising ionic monomeric units and non-ionic monomeric units, wherein the ionic monomeric units have at least one group represented by the formula —R$^1$SO$_3$⁻, wherein R$^1$ is a perfluoroalkylene group having from 1 to 15 carbon atoms, or a perfluoroalkyleneoxy or perfluoropoly(alkyleneoxy) group having from 1 to 15 carbon atoms and from 1 to 4 oxygen atoms, wherein the ionic fluoropolymer has an sulfonate equivalent weight in the range of from at least 600 grams up to and including 1200 grams, and wherein the dispersion of ionic fluoropolymer contains anionic species that are not covalently bound to the ionic fluoropolymer;
   contacting the dispersion of ionic fluoropolymer with an anion exchange resin having associated hydroxide ions, such that a portion of said anionic species are exchanged with hydroxide ions to provide an anion-exchanged dispersion; and
   separating the anion-exchanged dispersion from the anion exchange resin, wherein the anion-exchanged dispersion comprises ionic fluoropolymer, wherein the dispersion of ionic fluoropolymer contains less than 0.001 weight percent of nonionic emulsifier based on the total weight of ionic fluoropolymer.

2. The method of claim 1, wherein the dispersion of ionic fluoropolymer is free of nonionic emulsifier.

3. The method of claim 1, wherein the dispersion of ionic fluoropolymer contains less than 0.1 percent by weight of nonionic fluoropolymer.

4. The method of claim 1, wherein the amount of ionic fluoropolymer in the dispersion is in the range of from at least 5 percent by weight up to and including 20 percent by weight, based on the total solids content of the dispersion.

5. The method of claim 1, wherein the ionic fluoropolymer is prepared from monomers comprising

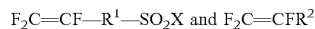
$$F_2C=CF—R^1—SO_2X \text{ and } F_2C=CFR^2$$

wherein R$^1$ is a perfluoroalkylene group having from 1 to 15 carbon atoms, or a perfluoroalkyleneoxy or perfluoropoly(alkyleneoxy) group having from 1 to 15 carbon atoms and from 1 to 4 oxygen atoms, and X represents F, Cl, or Br; and wherein R$^2$ represents F or a branched or unbranched perfluoroalkyl, perfluoroalkoxy or perfluoropoly(alkyleneoxy) group comprising 1 to 5 carbon atoms and from 0 to 2 oxygen atoms.

6. The method of claim 5, wherein the ionic tluoropotymner is prepared from monomers comprising tetrafouoroethylene and F$_2$C=CFO(CF$_2$)$^4$SO$_2$F.

7. The method of claim 5, wherein the monomers comprise at least one perfluorinated co-monomer represented by the formula

$$F_2=CFR^2$$

wherein R$^2$ represents F or a branched or unbranched perfluoroalkyl, perfluoroalkoxy or perfluoropoly(alkyleneoxy) group comprising 1 to 5 carbon atoms and from 0 to 2 oxygen atoms.

8. The method of claim 5, wherein the monomers comprise at least one of: tetrafluoroethylene; hexafluoropropylene; CF$_3$OCF$_2$CF$_2$CF$_2$=CF$_2$; CF$_3$OCF=CF$_2$; CF$_3$CF$_2$CF$_2$OCF=CF$_2$; a perfluoro-1,3-dioxole; a perfluorinated diolefin; a perfluorinated vinyl ether represented by the formula

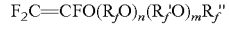
$$F_2C=CFO(R_fO)_n(R_f'O)_mR_f''$$

wherein R$_f$ and R$_f'$ are different linear or branched periluoroalkylene groups having 2 to 6 carbon atoms, m and n are independendy integers of from 0 to 10 and the sum of n and m is at least 1, and R$_f''$ is a perfluoroalkyl group having 1 to 6 carbon atoms; a pertluorinated vinyl ether monomer represented by the formula

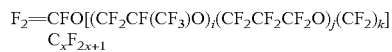
$$F_2=CFO[(CF_2CF(CF_3)O)_i(CF_2CF_2CF_2O)_j(CF_2)_k]$$
$$C_xF_{2x+1}$$

wherein i and j are independently integers in the range of from 0 to 10, k is an intecer in the range of from 0 to 3, and x is an integer in the range of from 1 to 5; and a perfluorinated vinyl ether represented by the formula

$$F_2C=CFOCF_2CF(CF_3)O(CF_2O)_qCF_3$$

wherein q is an integer in the range of from 0 to 3.

9. The method of claim 5, wherein the monomers further comprise at least one of ethylene, propylene, butylene, trifluoroethylene, 1-hydropentafluoropropene, 2-hydropentafluoropropene, vinyl fluoride, or vinylidene difluoride.

10. The method of claim 1, wherein the aqueous medium comprises water and organic solvent.

11. The method of claim 1, wherein more than half of the anionic species are exchanged with hydroxide ions.

12. The method of claim 1, further comprising forming a ionic fluoropolymer membrane from the anion-exchanged dispersion.

13. The method of claim 12, further comprising incorporating the ionic fluoropolymer membrane into a membrane electrode assembly.

14. The method of claim 1, further comprising combining catalyst and carbon particles with the anion-exchanged dispersion.

15. The method of claim 1, further comprising partially or completely removing the water from the dispersion or ionic fluoropolymer, and adding organic solvent to the dispersion of ionic fluoropolymer to provide a solvent exchanged dispersion.

16. The method of claim 15, wherein the dispersion of ionic fluoropolymer is contacted with the anion exchange resin after said partially or completely romoving the of water and addition of organic solvent.

17. The method of claim 16, further comprtsing forming an ionic fluoropolymer membrane from the dispersion.

18. The method of claim 17, further comprising incorporating the ionic fluoropolymer membrane into a membrane electrode assembly.

19. The method of claim 1, further comprising partially or completely removing the aqueous medium from the anion-exchanged dispersion, and adding organic solvent to aqueous medium to provide a solvent exchanged dispersion.

20. The method of claim 19, further comprising forming an ionic fluoropolymer membrane from the solvent exchanged dispersion.

21. The method of claim 20, futher comprising incorporating the ionic fluoropolymer membrane into a membrane electrode assembly.

22. The method of claim 1, wherein the dispersion further comprises cationic species that are not covalently bound to the ionic fluoropolymer, further comprising contacting the dispersion with cation exchange resin having acidic protons to provide a cation-exchanged dispersion, such that at least a portion of the cationic species are exchanged with protons.

23. The method of claim 22, wherein a major portion of the cationic species are exchanged with protons.

24. The method of claim 22, wiwrein more than half the anionic species are exchanged with hydroxide ions, and wherein more than half of the cationic species are exchanged with protons to provide a cation-exchanged dispersion.

25. The method of claim 24, further comprising partially or completely removing the aqueous medium from the cation-exchanged dispersion, and adding organic solvent to the aqueous medium.

26. The method of claim 24, wherein a portion or all of the cations are exchanged prior to exchanging at least a portion of the anions.

27. The method of claim 26, further comprising forming a ionic fluoropolymer membrane from the cation-exehanged dispersion.

28. The method of claim 27, further comprising incorporating the ionic fluoropolymer membrane into a membrane electrode assembly.

29. The method of claim 24, further comprising combining catalyst and carbon particles with the cation-exchanged dispersion.

* * * * *

UNITED STATES PATENT AND TRADEMARK OFFICE
CERTIFICATE OF CORRECTION

PATENT NO. : 7,304,101 B2
APPLICATION NO. : 10/894090
DATED : December 4, 2007
INVENTOR(S) : Klaus Hintzer It is certified that error appears in the above-identified patent and that said Letters Patent is hereby corrected as shown below:

On the title page item (56),
Column 2, Other Publications, Line 1, delete "Electrolyet" and insert -- Electrolyte -- in place thereof.

On the title page item (56),
Column 2, Other Publications, Line 14, delete "Disperion" and insert -- Dispersion -- in place thereof.

Column 5
Line 7, delete "incoroporated" and insert -- incorporated -- in place thereof.
Line 13, insert -- , -- folloing "purifying".
Line 13, delete "hxdrolyzing" and insert -- hydrolyzing -- in place thereof.

Column 8
Line 39, delete "$SO_2F-$" and insert -- $-SO_2F$ -- in place thereof.

Column 9
Line 61, delete "Mv4S" and insert -- MV4S -- in place thereof.

Column 11
Line 65, Claim 1, insert -- or all -- following "portion".

Column 12
Line 24, Claim 5, delete "unhranched" and insert -- unbranched -- in place thereof.
Lines 28-29, Claim 6, delete "tluoropotymner" and insert -- fluoropolymer -- in place thereof.
Lines 29-30, Claim 6, delete "tetrafouoroethylene" and insert -- tetrafluoroethylene -- in place thereof.
Line 30, Claim 6 delete "$CFO(CF_2)^4SO_2F.$" and insert -- $CFO(CF_2)_4SO_2F.$ -- in place thereof.
Line 35, Claim 7, delete "$F_2$" and insert -- $F_2C$ -- in place thereof.
Line 42, Claim 8 delete "$CF_3OCF_2CF_2CF_2$" and insert -- $CF_3OCF_2CF_2CF_2OCF$ -- in place thereof.
Lines 48-49, Claim 8 delete "periluoroalkylene" and insert -- perfluoroalkylene -- in place thereof.
Line 50, Claim 8, delete "independendy" and insert -- independently -- in place thereof.
Line 52, Claim 8, delete "pertluorinated" and insert -- perfluorinated -- in place thereof.
Line 55, Claim 8, delete "$F_2$" and insert -- $F_2C$ -- in place thereof.
Line 58, Claim 8, delete "intecer" and insert -- integer -- in place thereof.

UNITED STATES PATENT AND TRADEMARK OFFICE
CERTIFICATE OF CORRECTION

PATENT NO. : 7,304,101 B2
APPLICATION NO. : 10/894090
DATED : December 4, 2007
INVENTOR(S) : Klaus Hintzer It is certified that error appears in the above-identified patent and that said Letters Patent is hereby corrected as shown below:

Column 13
Line 15, Claim 15, delete "or" and insert -- of -- in place thereof.
Line 21, Claim 16, delete "romoving" and insert -- removing -- in place thereof.
Line 21, Claim 16, before "water" delete "of".
Line 23, Claim 17, delete "comprtsing" and insert -- comprising -- in place thereof.

Column 14
Line 1, Claim 21, delete "futher" and insert -- further -- in place thereof.
Line 7, Claim 22, insert -- a -- following "with".
Line 12, Claim 24, delete "wiwrein" and insert -- wherein -- in place thereof.
Line 12, Claim 24, insert -- of -- following "half".
Line 25, Claim 27, delete "exehanged" and insert -- exchanged -- in place thereof.

Signed and Sealed this

Fifteenth Day of July, 2008

JON W. DUDAS
*Director of the United States Patent and Trademark Office*